Aug. 13, 1963   M. M. CREME   3,100,360
PRECOILED ARTIFICIAL LURE
Filed Aug. 2, 1962

INVENTOR.
MICHAEL M. CREME
BY
ATTORNEY

United States Patent Office 3,100,360
Patented Aug. 13, 1963

3,100,360
PRECOILED ARTIFICIAL LURE
Michael M. Creme, 1219 Big Falls Ave., Akron, Ohio
Filed Aug. 2, 1962, Ser. No. 214,399
4 Claims. (Cl. 43—42.02)

This invention relates to the art of artificial lures and in particular has reference to an artificial lure that is molded in coiled configuration so as to enhance the worm simulating characteristics of the same during use by fishermen.

In recent years, the artificial lure industry has seen the introduction of simulated lures such as simulated worms made of plastic with such lures being accurately molded of soft plastic so as to look and feel like various animals, such as a night crawler worm, for example.

While manufacturers of such lures have succeeded in achieving an extremely life-like appearance in baits of this general characteristic, the same have been found to possess only a minimal simulation of a worm or similar animal during actual use by the fisherman. Such minimal simulation is believed to exist principally because of the fact that the lures in question have been molded in elongate straight line configuration and have been, more or less, of uniform cross sectional thickness throughout their longitudinal extent. The limited movement obtainable by this configuration reduces the effectiveness of such lures, since the general objective of artificial lures is to attract game fish which respond to movement.

It has been discovered that an increased body action can be given to lures of this general type by molding the same in a coiled condition with the result that as the lure is being pulled through the water, the forces of the water will tend to straighten the lure out into a long sinuous or spiral-like configuration, with the worm or other lure revolving in a spiral-like path during such movement as a result of the forces of the water against the moving body portion thereof. Rather life-like body movement is thereby achieved by virtue of the tendency of the coiled body portion to return to its coiled configuration, notwithstanding the above forces.

It has been also discovered that even further improved results can be attained by molding an auxiliary tail section on the rear portion of the bait. Thus, when the lure is being trailed through the water, the bifurcated tail thereby formed further enhances the spiraling body action above described.

Production of an improved lure having the characteristics above described accordingly becomes the principal object of this invention, with other objects thereof becoming more apparent upon a reading of the following brief specification, considered and interpreted in the light of the accompanying drawings.

Of the drawings:
FIGURE 1 is a plan view showing the improved bait in its normal coiled position.

Figure 1:
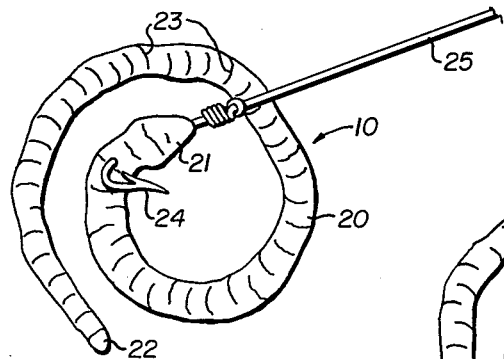

Referring now to the drawings and in particular to FIGURE 1, the improved lure, generally designated by the numeral 10, includes an elongate body portion 20 that preferably has a head section 21 and a tail section 22, with the body 20 being molded in coiled configuration so that the head portion 21 constitutes the innermost portion of the coiled lure body, while the tail portion 22 constitutes the outermost portion of the coiled lure body.

Simulated markings 23—23 are placed on the surface of the body and serve to provide a more life-like appearance to the lure 10.

In the preferred form of the invention herein shown, the head section 21 is illustrated as having a larger cross sectional diameter than the tail section 22, with the body preferably progressively tapering from its maximum diameter in the region of the head 21 to its minimum diameter in the region of the tail portion 22.

Figure 2:
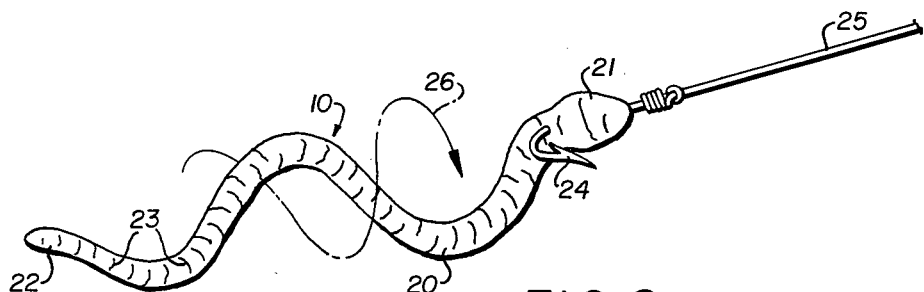
FIGURE 2 is a view showing the position of the lure of FIGURE 1 during movement through the water.

A hook 24 is attached to the end of the line 25 and is shown passing through the head 21, as in FIGURE 2. This permits drawing of the lure 10 through the water by drawing the line through the water in conventional fashion. In this regard and referring to FIGURE 2, the lure 10 is shown in a partially uncoiled condition and in this regard, due to the coiled construction aforementioned, the lure 10 will gyrate in a somewhat spiral path of the type illustrated by the arrow 26 in FIGURE 2 of the drawings, with the lure being elongated so as to be rotatable around the axis of the point of connection of the hook 24 with the head 21.

In this regard, it should be noted that, due to the decreased thickness of the tail section 22, this portion of the lure will be able to have a larger spiral path than will the portion disposed just rearwardly of the head portion 22, and as a result, a maximum body movement of the lure will occur, with the further result that the same will be more attractive to game fish being sought by the fisherman.

In this regard, a compound body motion will also be seen to be achievable by virtue of the manipulations that may be effectuated by the fisherman, with it being possible for the fisherman to pull the line tight followed by loosening the line, whereupon the body 10, in addition to rotating in the spiral path shown by arrow 26, will also axially compress and expand from its coiled and uncoiled positions so that a compound movement can be achieved by virtue of this jerking movement on the part of the fisherman using the lure.

With reference to the material of the improved lure, it is preferred that the same be made of poly-vinyl chloride or other soft rubbery plastic material that can be readily molded into life-like simulations of an animal such as an earth worm, as is illustrated in the drawings above described.

As a further advantage of the material above described, it has been found that the same has certain inherent recovery properties, with the result that the tapering of the same facilities extreme movement of the tail portion while permitting minimal movement of the region of the head, with such condition being desirable because the hook portion is located in a rather stationary position, whereby the same may be easily grasped by the fish attacking the more vigorous tail section.

In use or operation of the improved lure, it is merely necessary that the head 21 be attached to the hook 22, followed by connection of the hook, leader and line together. It is then merely necessary to insert the lure, hook and line into the water, whereupon the fisherman will merely pull the line through the water, with this resulting in the animated movement of the artificial bait as above described.

Figure 3:
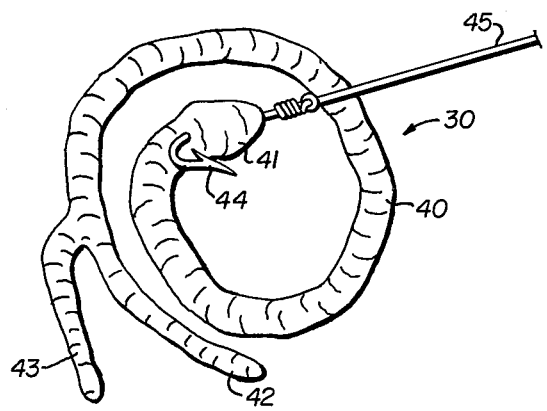
FIGURE 3 is a plan view similar to FIGURE 1 but showing a modification of the invention featuring the use of a bifurcated tail portion.
Figure 4:
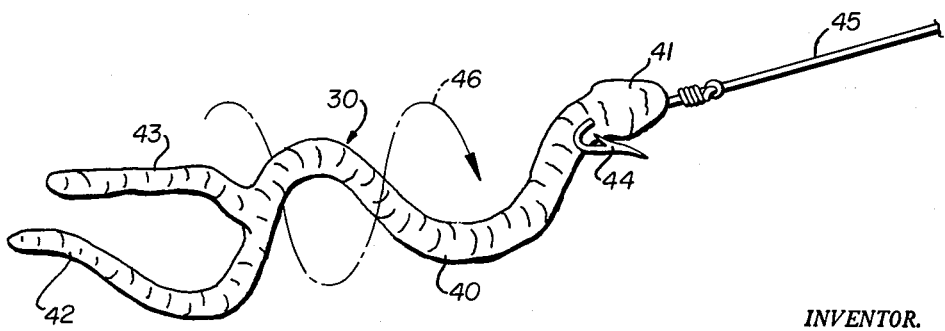
FIGURE 4 is a view showing the lure of FIGURE 3 during movement through the water.

With reference to the modification of FIGURES 3 and 4, the same is preferably constructed with the same material as before and is also preferably constructed in coiled configuration.

Accordingly, and referring to FIGURE 3, the improved lure 30 has an elongate body portion 40, a head portion 41 and a tail portion 42, with the head portion 41 being preferably of maximum cross-sectional thickness, while the body portion 40 of the lure 30 tapers towards minimal cross-sectional thickness in the region of the tail portion 42. Spaced forwardly of the tail 42 is an auxiliary tail 43 that extends radially outwardly from the body of the lure 30 in its coiled condition and is disposed in an oblique angle with reference to the lure 30 when the same is in the coiled condition shown in FIGURE 3. A hook 44 secured to line 45 is preferably passed through the head 41 of the lure so as to permit the lure 30 to be drawn through the water in a spiral course, as illustrated by the arrow 46 in FIGURE 4 of the drawings, with the spiral in this case being enhanced by the spiraling action caused by the auxiliary tail appendage 43.

In this regard, it is to be understood that in lieu of being attached to the hook 44, the lures 20 or 30 could be used as a trailing auxiliary member for another artificial bait and would merely need to be attached to the trailing end thereof so as to give a greater action to such a bait. In such case, the lure 30 will merely be considered as an auxiliary, action imparting, appendage for a bait that it can be secured to by a swivel for imparting additional spiral movement, as above described.

In use or operation of the modified form of the invention, the lure may be connected to the hook and employed in the water as before. Preferably, by connecting the head portion 41 with the hook 44 or to a swivel, as the case may be, and merely passing the same through the water, as by trolling, for example, the lure 30 would consistently rotate in spiral-like fashion, as illustrated by the numeral 46. It is to be understood that the lure 20 could be used similarly in such an auxiliary action imparting function.

In the event of still fishing or fishing where the line is alternately pulled and slackened, it is belived manifest that axially compressing movement of the lure 30 could be utilized as before, with the inherent recovery properties of the member tending to retract the same to coiled position except during periods that the same was forced to uncoiled position by the water forces acting thereagainst.

While a full and complete description of the invention has been set forth in accordance with the dictates of the patent statutes, it is to be understood that the invention is not intended to be limied to the scope herein illustrated. Thus, while the applicant herein has preferred plastic material from which the lure could be made, it is believed apparent that other plastic material or rubbery material capable of being molded to the configuration shown, could be employed.

Accordingly, modifications of the invention may be resorted to without departing from the spirit hereof or the scope of the appended claims.

What is claimed is:

1. An artificial lure of the character described, comprising;
   (A) a solid, flexible, elongate body of rubbery material,
      (1) having a modicum of rigidity and normally assuming the position of an earthworm that is positioned in coiled position on a flat surface;
      (2) having an innermost coiled end and an outermost coiled end that overlaps said innermost end to define a complete coil;
      (3) one said coiled end portion being adapted to be secured to a fishing line;
      (4) said lure rotating, in spiral-like fashion, around an axis that is generally coextensive with the axis of the connecting end of said fishing line during movement of said lure and said line through the water, and with the coiled configuration of said lure being extended along said axis during movement of said lure and said line through the water.

2. The device of claim 1 further characterized by the fact that said body longitudinally tapers in cross sectional thickness from a maximum thickness adjacent said innermost coiled end portion thereof, whereby said outermost end portion of said body has a greater resiliency than said innermost portion.

3. The device of claim 1 further characterized by the fact that said outermost coiled end portion of said body is bifurcated.

4. The device of claim 3 further characterized by the fact that one leg of said bifurcated portion extends at an oblique angle to said body in its elongated condition.

References Cited in the file of this patent

UNITED STATES PATENTS

| 743,570 | Savage | Nov. 10, 1903 |
|---|---|---|
| 1,691,225 | Clewell et al. | Nov. 13, 1928 |
| 2,519,338 | Arnold | Aug. 22, 1950 |
| 2,690,026 | King | Sept. 28, 1954 |
| 2,955,378 | Burke | Oct. 11, 1960 |
| 3,037,316 | De Zeeuw | June 5, 1962 |